June 17, 1969 C. DARR 3,451,031
RELAY SWITCHING ARRANGEMENT WITH MAGNETICALLY CONTROLLABLE SEMI-CONDUCTOR
Filed Dec. 29, 1966
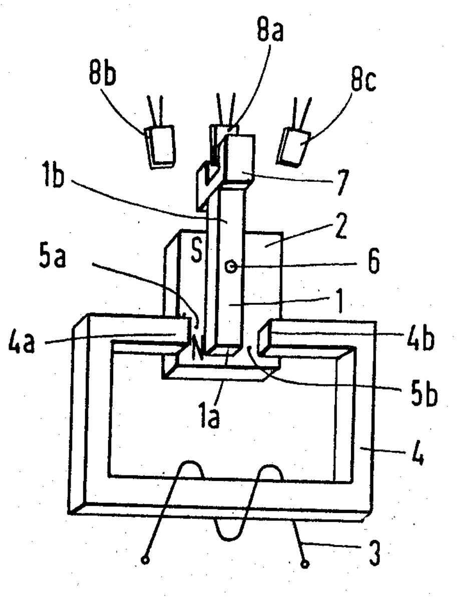
INVENTOR
Christian Darr
BY [signature]
ATTYS.

United States Patent Office 3,451,031

Patented June 17, 1969

3,451,031

RELAY SWITCHING ARRANGEMENT WITH MAGNETICALLY CONTROLLABLE SEMI-CONDUCTOR

Christian Darr, Munich, Germany, assignor to Siemens Aktiengesellschaft, a corporation of Germany Filed Dec. 29, 1966, Ser. No. 605,723
Int. Cl. H01c 7/16
U.S. Cl. 338—32 4 Claims

ABSTRACT OF THE DISCLOSURE

Switching arrangement for relays, etc., utilizing a magnetically controllable semi-conductor and cooperable armature carrying permanent magnet means for effecting control of said semi-conductor in dependence upon the position of the armature with respect thereto.

It is a known fact to utilize semi-conductor elements in the construction of electrically controllable switching arrangements. Transistors and controllable diodes, in particular, which are often designated electronic relays, have been utilized as such semi-conductor elements. This collective term is generally understood as including all constructional elements functioning in the manner of switches which execute the desired switching procedures without mechanically moved parts. Consequently, the particular advantage of such electronic relays resides in the feature that they do not possess any mechanically movable contacts which are subject to wear in dependence upon the number of actuations or connections.

As is well known, the useful operative life of electromagnetic relays is limited only because of the fact that the contact arrangement fails after a certain number of switching cycles while the actual relay system is, however, otherwise still completely intact. But in the utilization of the advantages obtained through the use of known electronic relays in the form of electrically controllable semi-conductor elements, the presence of particular disadvantages must be tolerated. For example, as a rule in the utilization circuit only one current direction is possible because of the rectifying effect of most electronic relays. In addition to this, the control circuit and the utilization circuit cannot be electrically separated from one another. The physical connection between control circuit and utilization circuit leads to the necessity that with regard to the load to be connected, one has to make certain allowances with regard to voltage. In addition to this, it is often difficult to adjust the input of an electronic relay in such a manner with respect to the control current source that optimum conditions are obtained. Furthermore, in certain types of electronic relays when the operation is such that the control current is slowly varied, the utilization current also only increases slowly, whereby the desired step-wise functional response normally desired cannot be obtained.

The disadvantages of electromagnetic or electronic relays can be avoided in a switching arrangement with a magnetically controllable semi-conductor when used as relay by the utilization of an electromagnetic system with a pivotal or tilting armature having a permanent magnet attached to the end thereof which effects the switching release, which permanent magnet in the operating position of the relay approaches the magnetically controllable semi-conductor in such a manner that in the semi-conductor and therewith in the connected utilization circuit, a spontaneous resistance increase occurs which can be utilized in the sense of a switch release.

Consequently, the relay system according to the invention employs no mechanically movable contacts, with the contact release taking place statically. Therefore the contact arrangement is not subject to a mechanical wear, nor is it any longer dependent upon surrounding conditions. While this is also true with respect to electronic relays of the type initially referred to, the disadvantages existing in such relays are not present in a relay system according to the invention. For example, through the utilization of an electromagnetic system with a control winding which can be freely selected over a large range, not only is there achieved an unequivocal physical separation between the input circuit and the utilization circuit of the magnetically controlled semi-conductor, but also the possibility of an optimum adjustment to the control voltage. Furthermore, the resistance change in the connected utilization circuit is not dependent upon the control current of the relay, but in the case of given spatial arrangement only upon the field intensity which may be arbitrarily determined, of the permanent magnet attached to the armature, and effecting the resistance increase.

In addition, even when the control current is changed slowly, a flip or snap characteristic is obtained in the utilization circuit as the armature movement of the relay takes place only upon appliance of a specific induction current. In this case a preferred embodiment of the invention utilizes as a magnetically controllable semi-conductor a two-terminal network with large electron mobility, preferably of an indium-antimony complex with metallic inclusions.

It is immaterial in the utilization of the invention whether the relay system is a neutral or a poled system. While as a rule, in the case of a natural relay system, only the on-position can be recognized in the utilization circuit, in the case of a poled system generally several positions are intended to be detected electrically. In addition, occasionally the rest position of the armature is intended to be evaluated electrically. Then in the case of a poled relay with a central rest position and two operating positions at least one controllable semi-conductor can be associated with each position of the armature.

Expediently, the resistance increase of the semi-conductor effected in the release state, is changed into an opening of the utilization circuit through a subsequently inserted closed-circuit connection. For this purpose an electromagnetic relay of appropriate contact arrangement can be employed or also an electronic switching element, for example, a transistor.

Further details of the invention are evident from the following description of a construction example, the figure illustrating, in a simplified manner, a poled relay according to the invention.

The individual elements of the poled relay represented in the figure are suitably mounted on a support not illustrated, the essential parts being the exciting part, the part providing the preliminary magnetizing, and the contact part. The preliminary magnetizing of the relay is obtained through a permanent magnet 2 disposed below the armature 1. The excitation flow is produced by the actuation winding 3 which carries current in accordance with the operation involved, such winding being cooperable with a suitable core 4, for example, a laminated iron core. Permanent flux and excitation flux overlap substantially in the operating air gaps 5*a* and 5*b*. The armature of the relay is pivotally supported at 6 on a torsion bar spring, not shown, which is normally attached to a prestressing arm. The end 1*a* of the armature 1 is disposed between the pole pieces 4*a* and 4*b* of the iron core 4 while at the other end 1*b* of the armature is attached a permanent magnet 7 which, in the illustrated control rest position of the relay, is disposed adjacent to the magnetically controllable semi-conductor 8*a*.

If a control current flows through the actuation winding in a certain direction, the permanent flux is weakened in one air gap and increased in the other air gap so that the armature 1 tilts toward the side of the stronger flux. In this manner the movement of the armature 1 is made dependent upon the direction of the control current through the actuating winding 3. Therewith, in accordance with the current direction in the actuation winding 3, two final positions, which normally will be defined by special stops, are obtained for the armature 1. In these final positions of the armature 1, the permanent magnet 7 is either closely adjacent to the semi-conductor 8*b* or to the semi-conductor 8*c*.

As is well known, magneticaly controllable semi-conductors are two-terminal networks with large electron mobility and preferably consists of an indimum-antimony complex with metallic inclusions. If a permanent magnet is brought close to such a semi-conductor, its resistance increases as a result of the magnetic field acting thereupon. This is true in the same manner for both polarities of the magnetic field. In this case, linearity exists between the effective magnetic field and the current flowing through the semi-conductor so that the semi-conductor can be considered as a controlable ohmic resistance. Since such semi-conductors, which the also termed field plates, have extremely small proportions and the carrier often also possesses a thickness of only approximately 0.5 mm., such semi-conductors can be substituted without difficulties, for mechanical contacts and in such case do not increase the constructional volume of customary electromagnetic relays or their contact arrangements. In order to obtain a contact multiplication in the individual operating positions of a relay several semi-conductors of this type can be utilized which, in such case, can be controlled by the same permanent magnet.

Naturally the present invention is not limited to the illustrated example of construction. For example, for obtaining an armature motion, instead of an electromagnetic actuating system, a system which operates electrodynamically, electrostatically, electrothermally, piezoelectrically or magnetostrictively can be readily utilized.

The obtainable contact force in actuating systems, particularly of the types referred to, often is so small that a mechanical actuation can operatively be realized only with difficulties. However, with the invention, the free movement of the armature during actuation thereof is, in itself, suffificient for the control of the utilization circuit.

Changes may be made within the scope and spirit of the appended claims which define what is believed to be new and desired to have protected by Letters Patent.

I claim:

1. A contactless electromagnetically operated relay comprising:

a plurality of spaced-apart semi-conductor devices disposed along an arcuate path, each said device having a pair of terminals for connection in an external circuit and each said device having a resistance characteristic which exhibits a spontaneous resistance increase between its terminals in response to the application of a magnetic field thereto;

an armature mounted for rotation and including a first end disposed for movement along the arcuate path, a first permanent magnet carried by said first end for changing the resistance of said semiconductor devices, and a second end;

a core including a pair of facing pole pieces defining a gap therebetween, said second end of said armature being disposed in the gap;

a second permanent magnet bridging the gap to premagnetize said armature and produce a polar characteristic for said relay; and a control winding for receiving control pulses to establish magnetic fields which selectively position said first end of said armature and said first permanent magnet adjacent a selected semiconductor device, the field of said second permanent magnet maintaining the positioning of said armature until another control signal is received.

2. A relay according to claim 1, wherein said first permanent magnet includes a pair of pole pieces defining a gap therebetween and wherein each said semi-conductor device is disposed to extend into said gap.

3. A relay according to claim 1, wherein each said semi-conductor device comprises a two-terminal network with large electron mobility.

4. A relay according to claim 3, wherein each said semi-conductor device comprises an indium-antimony complex with metallic inclusions.

References Cited

UNITED STATES PATENTS

| | | | |
|---|---|---|---|
| 3,286,161 | 11/1966 | Jones | 338—32 |
| 3,307,125 | 2/1967 | Scrwarzkopf | 335—205 |

BERNARD A. GILHEANY, *Primary Examiner.*

H. BROOME, *Assistant Examiner.*

U.S. Cl. X.R.

335—81